US010289573B1

United States Patent
Boyd et al.

(10) Patent No.: US 10,289,573 B1
(45) Date of Patent: May 14, 2019

(54) BUS BASED TIMED INPUT OUTPUT MODULE

(71) Applicant: National Technology & Engineering Solutions of Sandia, LLC, Albuquerque, NM (US)

(72) Inventors: Gerald M. Boyd, Albuquerque, NM (US); Dominic A. Montoya, Albuquerque, NM (US); Gregory L. Wickstrom, Albuquerqe, NM (US); Jeffrey E. Farrow, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/696,417

(22) Filed: Sep. 6, 2017

Related U.S. Application Data (60) Provisional application No. 62/486,648, filed on Apr. 18, 2017.

(51) Int. Cl.
*G06F 13/12* (2006.01)
*G05B 19/04* (2006.01)
*G06F 13/362* (2006.01)

(52) U.S. Cl.
CPC ........ *G06F 13/122* (2013.01); *G06F 13/3625* (2013.01)

(58) Field of Classification Search
CPC .................................................. G05B 19/0423
USPC ........................................................ 710/58
See application file for complete search history.

(56) References Cited

U.S. PATENT DOCUMENTS

| 5,546,862 A | 8/1996 | Schabdach |
| 6,546,873 B1 | 4/2003 | Andrejkovics et al. |
| 7,043,193 B1 * | 5/2006 | Vashi ................ G09B 7/00 434/323 |
| 7,228,186 B2 * | 6/2007 | Karschnia ............ G05B 19/054 370/410 |
| 7,831,722 B2 | 11/2010 | Holden et al. |
| 9,003,095 B2 * | 4/2015 | Molnar .................. G06F 1/266 361/641 |
| 9,148,481 B1 | 9/2015 | Boyd et al. |
| 9,258,244 B1 | 2/2016 | Boyd et al. |
| 9,880,539 B2 * | 1/2018 | Miles ................. G05B 19/0423 |
| 2010/0251917 A1 | 10/2010 | Land |
| 2010/0282050 A1 | 11/2010 | Peers-Smith |
| 2016/0110557 A1 * | 4/2016 | Woesten ............. H04L 41/0813 726/28 |
| 2017/0220404 A1 * | 8/2017 | Polar Seminario ..... G06F 8/654 |
| 2017/0350401 A1 * | 12/2017 | Lockwood .......... F04D 15/0077 |

* cited by examiner

*Primary Examiner* — Brian T Misiura
(74) *Attorney, Agent, or Firm* — Medley, Behrens & Lewis, LLC (57) ABSTRACT

Described herein are features related to a bus based timed input output module (TIO) for use in control systems of physical systems, particularly where the physical systems are safety critical systems. When the TIO is powered on, one or more operations are performed by the TIO, wherein the one or more operations, when performed by the TIO: 1) cause the TIO to be non-functional, thereby preventing the TIO from improperly or accidentally activating a Component in communication with the TIO; 2) clears the TIO of previous operations (if any); and 3) facilitates compatibility of the TIO with an arbitrary Component.

18 Claims, 6 Drawing Sheets

BUS BASED TIMED INPUT OUTPUT MODULE

RELATED APPLICATION

This application claims priority to U.S. Provisional Patent Application No. 62/486,648, filed on Apr. 18, 2017, entitled "BUS BASED TIMED INPUT OUTPUT MODULE", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Conventionally, control of physical systems, particularly safety critical systems (e.g., avionics communications systems, power control systems, etc.), is accomplished by point-source controllers. More particularly, some form of a Command Module, (CM) often in the form of an application specific integrated circuit (ASIC) module, asserts values on many discrete wires to a plurality of devices in a physical system. Generally, circuitry of the CM is fixed, thereby allowing predictable operation of the control system. However, this implementation can be inflexible when a modification of the physical system occurs. For example, and not by way of limitation, the CM may need to be replaced (due to its fixed circuitry) when requirements change for the physical system occurs. Exemplary requirements changes include addition, elimination, or changes to one or more components in a system.

SUMMARY

The following is a brief summary of subject matter that is described in greater detail herein. This summary is not intended to be limiting as to the scope of the claims.

Described herein are features related to a bus-based timed input output module (TIO) used for control of physical systems, particularly safety critical systems. Generally, features of the TIO provide common configurable I/O for flexible and assured operation of a system (and subsystems of that system). An exemplary system includes some form of a Command Module (CM) that sends commands over a data bus to a TIO. In turn, the TIO drives other system components over discrete lines. Power can be provided to any of these elements via a separate power bus, or any number of discrete sources.

The TIO comprises a hardware logic controller (e.g., an application-specific integrated circuit (ASIC), a field-programmable gate array (FPGA), etc.) that comprises: 1) output circuits used to sequence output pulses used to drive system components; 2) input circuits that gather information from system components; and 3) control circuits that communicate with the CM through the data bus, and coordinate with the input/output circuits to effect the requested operations from the CM. When power is applied to the TIO, it is inherently incapable of functioning any system component, and will remain so until it receives information from the CM, potentially facilitating compatibility with system components.

When powered, the TIO will formulate a status message reflecting its internal state, and will also include the state of its input circuits. That message will then be delivered to the CM via the data bus. After sending power up status data, the TIO can accept information from the CM which can include configuration or output specification data in the form of time/value pairs.

In the exemplary System, when a "run" command is received from the data bus, all time/value pairs will be erased from its internal memory as they are used, preventing replay, and assuring that once all pulse sequences have been sent to the system component it will once again be in a "safe" state since it will no longer contain information compatible with that component. After completion of a "run" command, the TIO Module will be ready to receive more commands.

The CM can configure the TIO for what data to include in its status information that is gathered from its input circuits. Via analog translation hardware, the TIO's input and/or output circuits can be configured to control or monitor data to/from multiple system components.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies are presented herein pertaining to a bus based timed input output module (TIO) that provides common configurable I/O for use in a control system by way of changing a state of a component of the TIO, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), etc.

Figure 1:
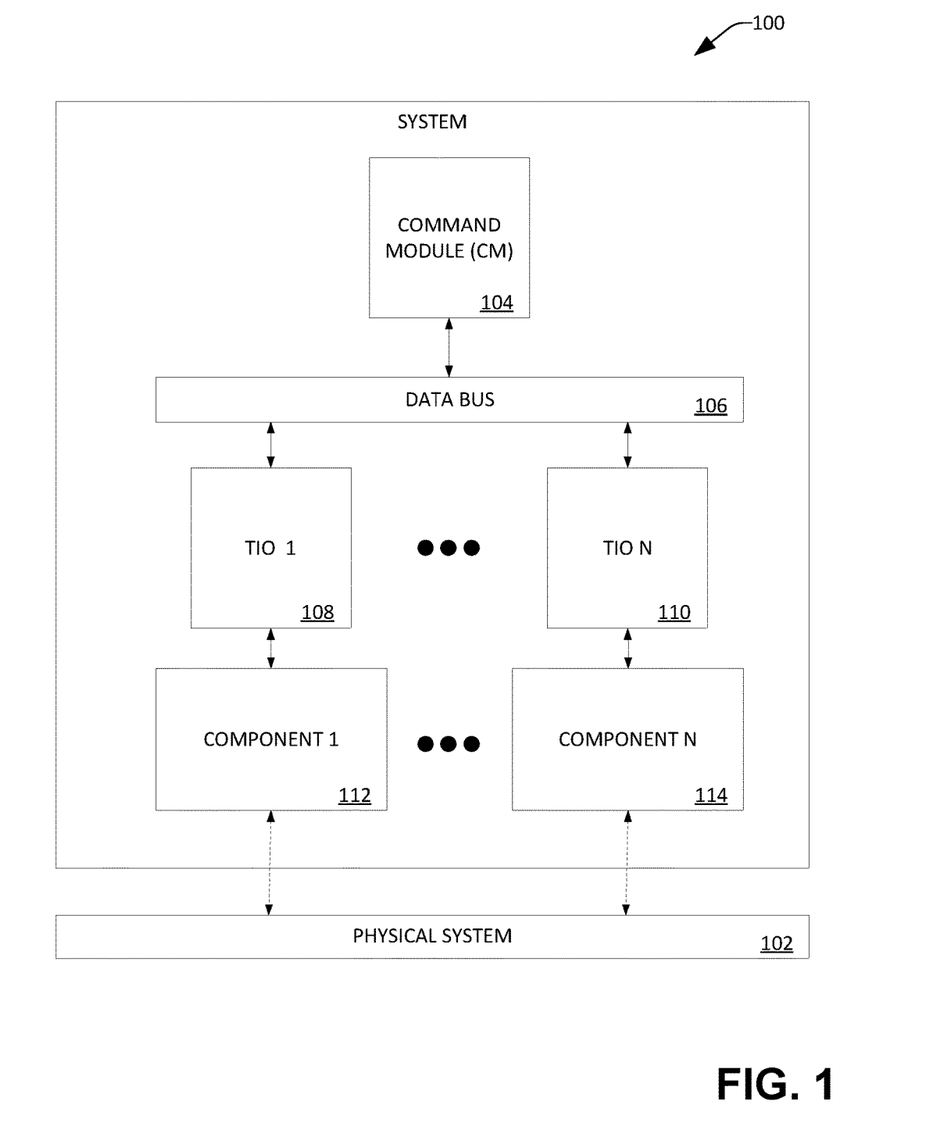
FIG. 1 is a functional block diagram of an exemplary System where communications are transmitted over a Data Bus, and wherein the System includes timed input output modules (TIOs), and the Components that they control/monitor.

With reference now to FIG. 1, an exemplary System 100 is illustrated. The System 100 is configured to control a Physical System 102, particularly safety critical systems (e.g., avionics communication systems, power control systems, etc.), that comprises devices (e.g., actuators, motors, switches, etc.). Generally, the System 100 is configured to control operation of the devices of the Physical System 102. The devices can be or comprise devices in an aircraft, devices deployed in a power station that is used to operate the power station, etc. As noted above, conventionally, control systems for safety critical systems include discrete controllers that control the devices of the Physical System 102 through fixed circuitry in the discrete controllers. These aforementioned control systems, however, are inflexible due to the fixed circuitry, because replacement discrete controllers are required when, for example, a change in the Physical System 102 occurs. For instance, when a device in the Physical System 102 is replaced with a newer (updated) device, the discrete controller may not be configured to communicate with the newer device. The exemplary System 100, as will be described in greater detail herein, can provide assured functionality for a safety critical Physical System while providing flexibility, such that devices of the Physical System 102 can be added, removed, and/or replaced without requiring new discrete controllers.

With more detail pertaining to the System 100, the System 100 comprises a Command Module (CM) 104, a Data Bus 106, a plurality of TIOs 108-110, and a plurality of Components 112-114. The CM 104 can comprise a microcontroller, a system on a chip (SoC) that implements a state machine, etc., wherein the CM 104 is communicatively coupled to the Data Bus 106 (e.g., the CM 104 places data on and retrieves data from the Data Bus 106). The Data Bus 106 is configured to direct data between the CM 104 and the TIOs 108-110, which in turn are coupled to the plurality of Components 112-114. Additionally, the Data Bus 106 can operate as a power bus, such that the CM 104, the TIOs 108-110, and/or the Components 112-114 can be powered by way of the Data Bus 106. In another embodiment, the System 100 can include a separate power bus (not pictured) that is configured to provide power to the CM 104, the TIOs, and/or the Components 112-114 of the System 100.

The CM 104, generally, is configured to govern operation of the Physical System 102. More particularly, the CM 104 can send data, including commands, by way of the Data Bus 106 to the TIOs 108-110, wherein the commands cause the Components 112-114 (that are in communication with the TIOs 108-110) to run control functions on the Physical System 102. Additionally, the CM 104 can receive data from one or more of the Components 112-114 by way of the Data Bus 106. The CM 104 can send the commands based upon logic programmed in the CM 104 (e.g., time-based operations) and/or data received from devices (of the Physical System 102) that are in communication with the plurality of Components 112-114 (e.g., temperature measurements, pressure measurements, etc.). The Components 112-114 can comprise circuitry and or logic that sends or receives control function (e.g., signals) from 1) input devices (e.g., a pushbutton, a micro-switch, a selector switch, etc.), or 2) output devices (e.g., actuators, squibs, safety switches, etc.) that are located on the Physical System 102.

Generally, each TIO in the plurality of TIOs 108-110 is configured to control functionality of a respective component device in the plurality of Components 112-114. For instance, the TIO 108 is positioned between the Data Bus 106 and the Component 112. As will be described in greater detail herein, the TIO 108 is configured to receive from the CM 104 (by way of the Data Bus 106): 1) program data, wherein program data can be executed by the TIO 108 to cause the Component 112 to run a control function on the Physical System 102; and 2) a run command that causes the TIO 108 to execute the program data. The TIO 108 is configured to, as it executes the program data, clear the program data from the TIO 108. Consequently, the TIO 108 can be flexibly used with a different Component than the Component 112 due to an ability of the TIO 108 to store and execute different program data (that is received from the CM 104).

Figure 2:
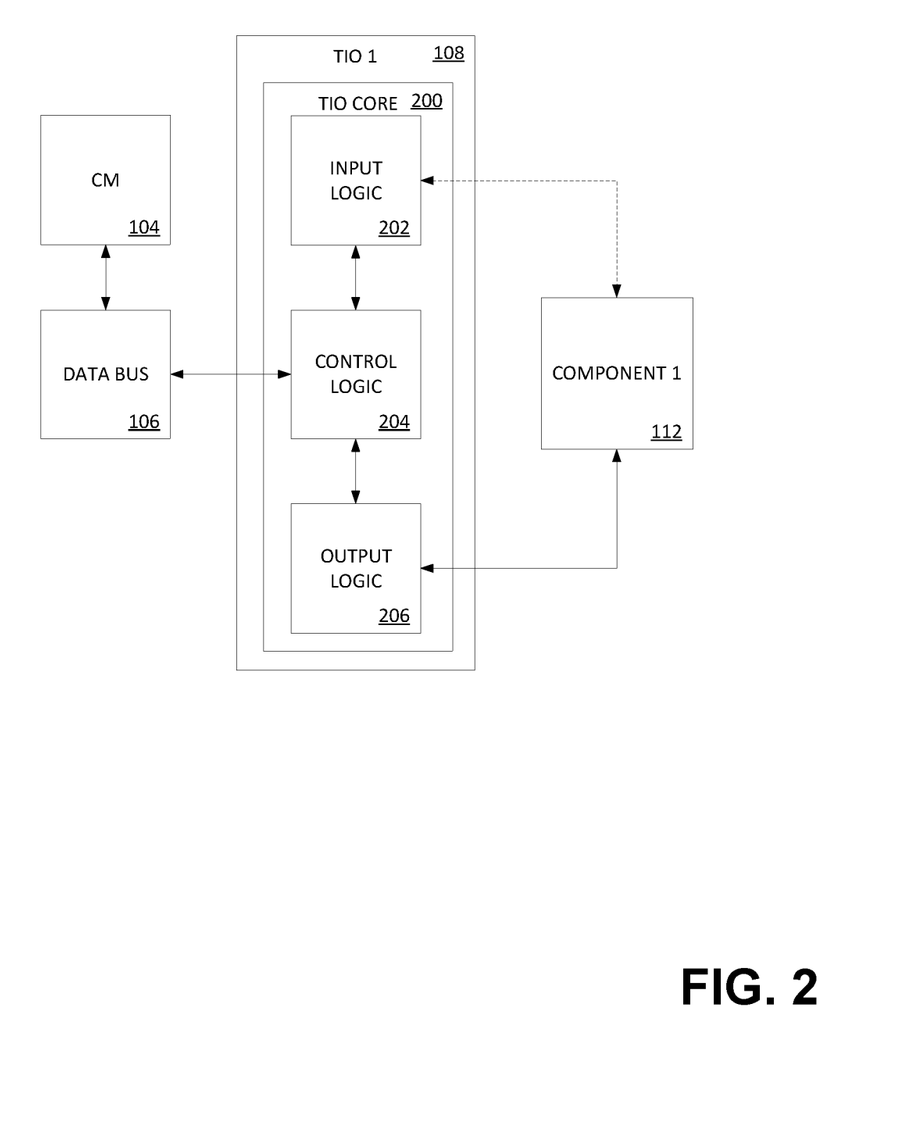
FIG. 2 is a functional block diagram of an exemplary TIO.

With reference now to FIG. 2, a functional block diagram of the exemplary TIO 108 is illustrated. The TIO 108 comprises a TIO Core 200, wherein the TIO Core 200 comprises a hardware logic controller (e.g., an application-specific integrated circuit (ASIC), a field-programmable gate array (FPGA), etc.). The TIO Core 200 comprises Input Logic 202, Control Logic 204, and Output Logic 206. The Control Logic 204 is configured to, when the TIO Core 200 is provided with power and turned on, ensure that components of the TIO Core 200 (e.g., the Output Logic 206) fail to include information that would allow the TIO 108 to drive the Component 112. In other words, when the TIO 108 is powered on, the TIO 108 becomes non-functional (e.g., acts as a brick), wherein the TIO 108 fails to include any programming or data that is usable to control the Component 112, thereby preventing the TIO 108 from improperly or accidentally activating the Component 112. For example, when the TIO 108 is powered on, the Output Logic 206 used for operations that the TIO 108 may have previously executed is cleared. Additionally, as previously mentioned, clearing the Output Logic 206 facilitates compatibility of the TIO 108 with Components that are different from the Component 112.

In addition to clearing the Output Logic 206 of the TIO Core 200, the Control Logic 204 is configured to: 1) responsive to clearing the Output Logic 206, transmit status data to the CM 104, wherein the status data indicates that the Output Logic 206 has been cleared; 2) subsequent to transmitting the status data, receive and store program data (that is addressed to the TIO 108 from the CM 104), wherein the program data comprises instructions that, when executed by the TIO 108, cause the TIO 108 to control operation of the Component 112; and 3) responsive to receiving a run command, execute the program data. Additionally, the Control Logic 204 ensures that the run command is valid prior to executing the program data. For instance, the Control Logic 204 configured to determine whether or not the run command comprises an approved validation value or an unapproved validation value. When the run command comprises an approved validation value, the Control Logic 204 is configured to execute the program data based upon the approved validation value. When the run command comprises an unapproved validation value, the Control Logic 204 is configured to clear the TIO Core 200 of the program data.

The Output Logic 206 of the TIO Core 200 comprises programmable logic that can be configured by the Control Logic 204. The Control Logic 204 can configure the Output Logic 206 such that activation of the Output Logic 206 causes the Component 112 to operate a control function (e.g., enablement/disablement of a safety switch, movement of an actuator, etc.) on a device on the Physical System 102. In an embodiment, the Output Logic 206 comprises a pattern generator that provides deterministic timing to a field-effect transistor (FET) of the Component 112 based upon time value pairs stored in a first in first out (FIFO) memory buffer of the pattern generator. In non-limiting examples, the pattern generator can output a pattern having a 16 bit output value, a 100 nano-second resolution, a 24 bit dwell time per event, a 2048 event memory depth, and a 24 bit validation value. It is to be understood that the TIO 108 can be programmed such that the aforementioned values (e.g., 16 bit, 100 nano-second, etc.) pertaining to the pattern generator can be altered, and thus these values are exemplary. Further, the pattern generator can implement safety features well-known in the art. Additionally, the Output Logic 206 can optionally be coupled to end-user provided analog circuitry that is on the TIO 108, wherein the analog circuitry can amplify a signal that is output by a Component that is connected to a device that, for example, requires high amperage or high voltage.

The Input Logic 202 of the TIO Core 200 is configured to receive state data from the Component 112, wherein the state data indicates a state of the Component 112. Further, the Input Logic 202 can support modes well-known in the art, e.g., request for input mode (where the Input Logic requests a status command), a TM (time-based sample) mode, a change detect mode, etc. The Control Logic 204 of the TIO Core 200 can configure the Output Logic 206 based upon the state data.

Operation of the TIO 108 is now described. Prior to receiving program data and a run command from the CM 104 by way of the Data Bus 106 (e.g., when the TIO 108 is powered on), the Control Logic 204 of the TIO Core 200 is configured to: force IO outputs of the TIO Core 200 to zero; disable the run command of the TIO Core 200, such that if the TIO Core 200 receives a run command, the TIO Core refrains from performing any action (e.g., refrains from executing any instructions); clear a FIFO buffer of a pattern generator of the Output Logic 206; and/or disable the pattern generator of the Output Logic 206. The Control Logic 204 is configured to perform one or more of these operations when: 1) the TIO 108 receives power and is turned on; 2) the Control Logic 206 executes program data that causes the Component 112 to run a control function on the Physical System 102; and/or 3) when the Control Logic 204 receives a run command with an unapproved validation value.

Responsive to the TIO Core 200 performing one or more of the operations referenced above, the Control Logic 204 is configured to enable a command interface of the Control Logic 204, wherein the command interface is configured to store program data in the Output Logic 206 and receive a run command. Additionally, responsive to performing one or more of the operations referenced above, the Control Logic 204 is configured to send status data to the CM 104 by way of the Data Bus 106, wherein the status data comprises an indication that the one or more operations have been performed and/or that the command interface has been enabled.

Subsequent to receiving the status data, the CM 104 is configured to send the program data to the TIO 108 (e.g., by way of the Control Logic 204 of the TIO Core 200). In an example, the CM 104 transmits the program data responsive to a sensor of the Physical System 102 reporting a certain temperature, responsive to receiving user input, etc. The program data, generally, comprises instructions that facilitate activation of the Component 112. More particularly, the Control Logic 204 of the TIO Core 200 can, responsive to receiving the program data, configure the Output Logic 206 based upon the program data such that activation of the Output Logic 206 causes the Component 112 to run a control function (e.g., enablement/disablement of a safety switch, movement of an actuator, etc.) on the Physical System 102. In an example where the Output Logic 206 comprises a pattern generator that provides deterministic timing to a field-effect transistor (FET) of the Component 112, the program data can comprise a plurality of time value pairs. In the example, the Control Logic 204 can store the plurality of time value pairs in a FIFO buffer of the pattern generator.

Further, subsequent to receiving the program data from the CM 104 by way of the Data Bus 106, the Control Logic 204 of the TIO Core 200 can be configured to receive a run command from the CM 104. Responsive to receiving the run command, the Control Logic 204 is configured to cause the Output Logic 206 to execute, wherein execution of the Output Logic is based upon the program data and causes the Component 112 to run a control function on the Physical System 102. In the example shown in FIG. 2, the Output Logic 206 is directly wired to inputs of the Component 112, and, thus, causes the Component 112 to run a control function on the Physical System 102, shown in FIG. 1.

Figure 3:
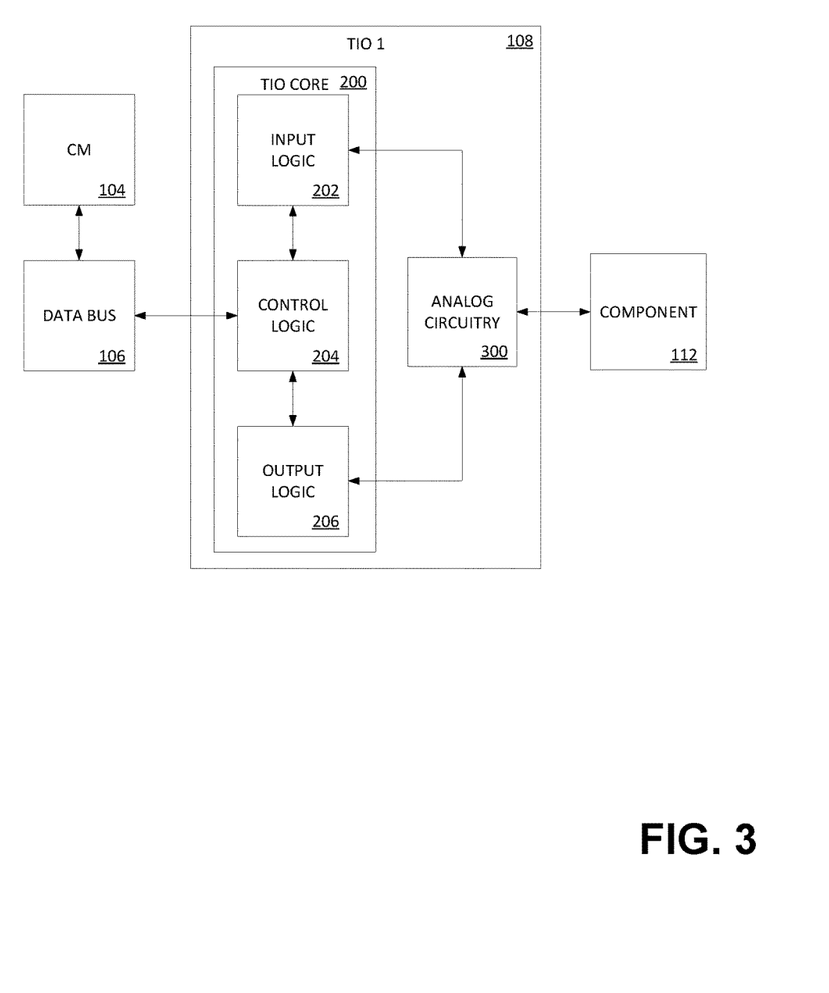
FIG. 3 is a functional block diagram of an exemplary TIO that comprises end-user Analog Circuitry.

With reference now to FIG. 3, the TIO 108 can additionally comprise analog circuitry 300 that is provided by an end-user, wherein the Output Logic 206 is coupled to the analog circuitry 300. The analog circuitry 300 can amplify a signal that is output by the Output Logic 206 when the TIO 108 is connected to a Component that, for example, requires high amperage or high voltage (for a control function to be performed). In addition to the analog circuitry 300, pulse width modulator (PWM) generators (not pictured) can be included on the TIO 108 to generate the patterns emitted by the pattern generator.

As the Output Logic 206 executes and causes the Component 112 to perform the control function, the Output Logic 206 is configured to clear the Output Logic 206 of the program data, thereby removing remnants of the program data and/or remnants of other data that caused the Component 112 to perform the control function. By removing these remnants, the Output Logic 206, responsive to receiving a second run command, is unable to cause the Component 112 to perform the control function (because the Output Logic 206 has not been configured based upon the program data or does not have the program data stored in memory of the Output Logic 206).

In the example where the Output Logic 206 comprises the pattern generator, the pattern generator is configured to generate a waveform based upon the time value pairs stored in the FIFO buffer of the pattern generator (and an approved validation value in the run command). As the pattern generator generates the waveform based upon a time value pair in the time value pairs, the Output Logic 206 is configured to zero out memory in the FIFO buffer that stores the time value pair. Consequently, after generating the waveform, the FIFO buffer of the pattern generator retains zeros (and none of the time value pairs that are stored based upon the program data).

Subsequent to the Output Logic 206 causing the Component 112 to run a control function on the Physical System 102, the Control Logic 204 of the TIO Core 200 is configured to receive additional program data and an additional run command, wherein the Output Logic 206 has been cleared of previous operations that it has performed.

Figure 4:
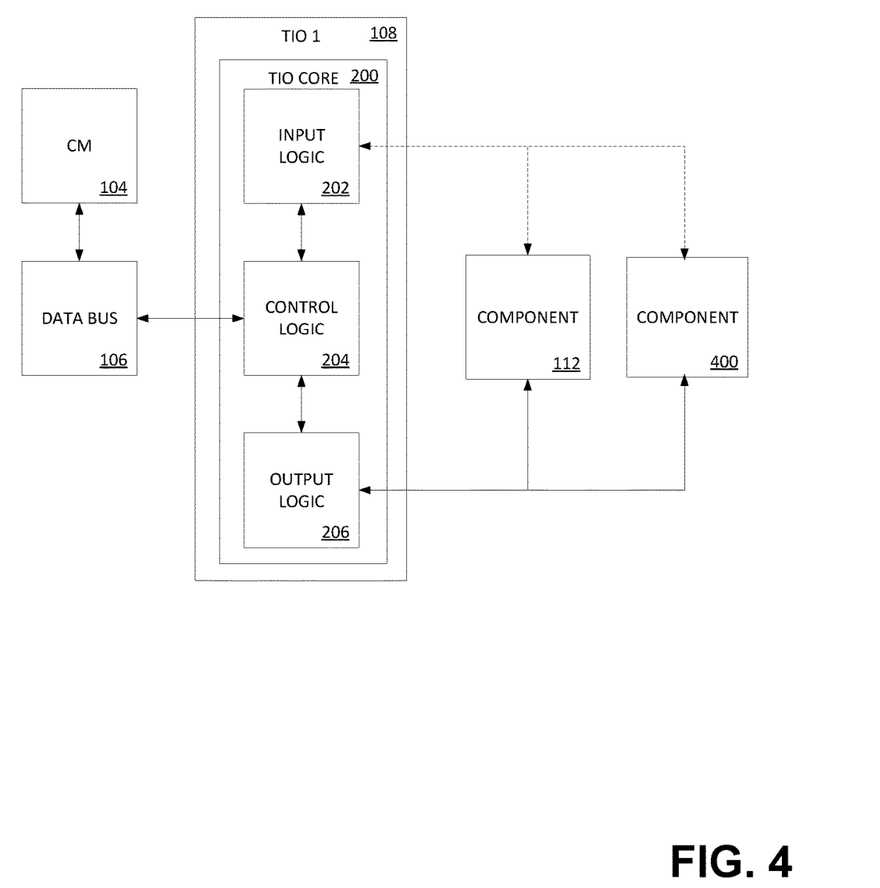
FIG. 4 is a functional block diagram of an exemplary TIO that is connected to multiple Components.

With reference now to FIG. 4, an embodiment where the TIO 108 is connected to multiple Components 112, 400 is illustrated. Generally, the TIO 108 operates similarly to what has been described above. The Control Logic 204 of the TIO Core 200 can, however, responsive to receiving the program data, configure the Output Logic 206 based upon the program data such that activation of the Output Logic 206 causes the Component 112 to run a first control function and the Component 400 to a run second control function. The Control Logic 204, responsive to receiving a (single) run command can cause the Components 112 and 400 to perform the respective control functions. As previously described, the Output Logic 206 is configured to clear the Output Logic 206 of the program data, thereby removing data that indicates that the Output Logic 206 caused the Components 112 and 400 to send the respective control functions.

Figure 5:
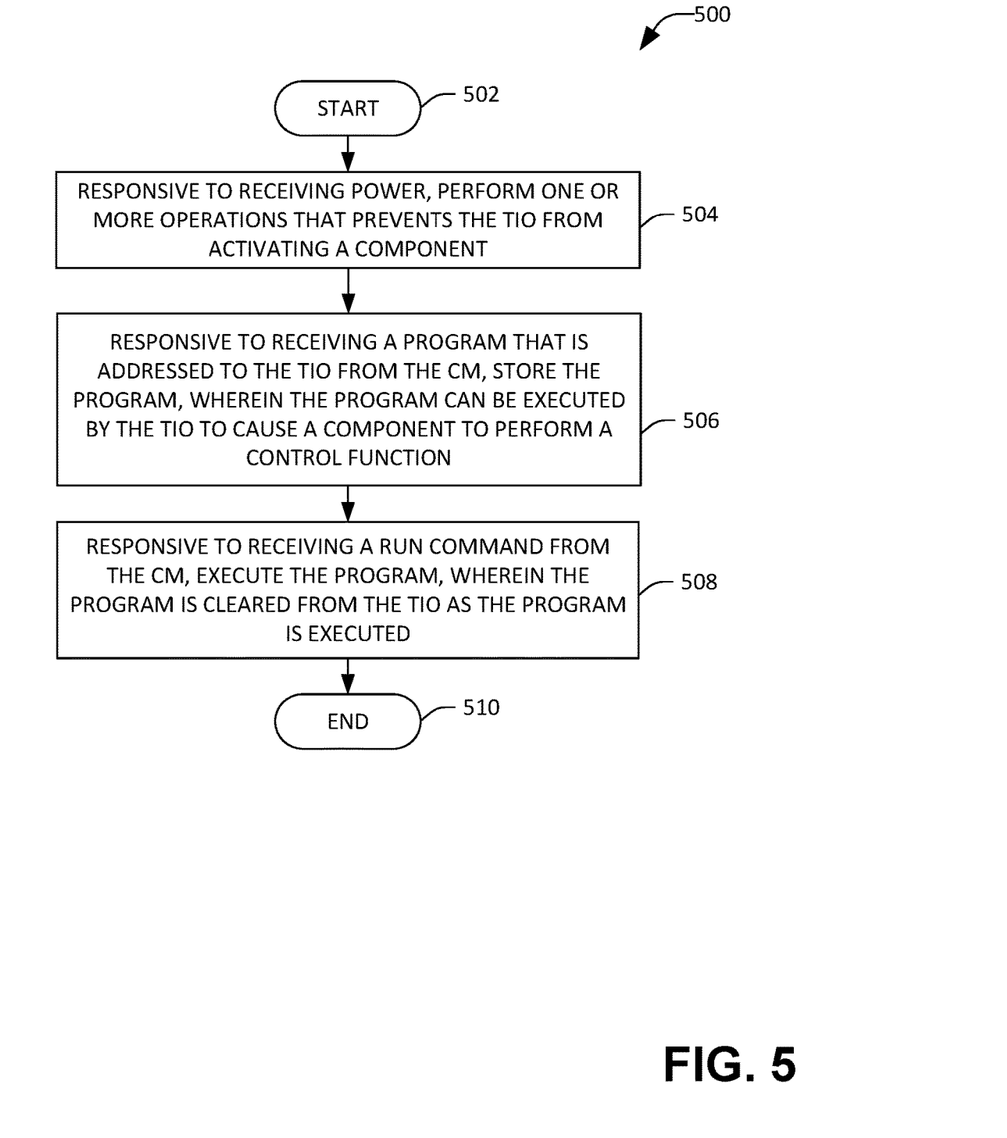
FIG. 5 is a flow diagram that illustrates an exemplary methodology for transmitting data in a system over a Data Bus.

Referring now to FIG. 5, an exemplary methodology 500 that facilitates transmitting data in a control system over a Data Bus, wherein the control system includes a TIO, is illustrated. In an example, the methodology 500 is executed by a TIO, which can be or include a hardware logic controller, such as an FPGA. The methodology 500 begins at 502 and, at 504, the hardware logic controller, responsive to receiving power and transitioning from a power off state to a power on state, performs one or more operations that causes the hardware logic controller to be non-functioning, thereby preventing the hardware logic controller from improperly or accidentally activating a Component that is in communication with the TIO.

At 506, responsive to receiving a program that is addressed to the hardware logic controller from a CM (by way of the Data Bus), the hardware logic controller is configured to store the program, wherein the program can be executed by the hardware logic controller to cause the Component to run a control function on the Physical System 102. In the example, Control Logic of the hardware logic controller can be configured to store the program in Output Logic of the hardware logic controller. The program, generally, comprises instructions that facilitate activation of the Component.

At 508, responsive to receiving a run command from the CM, the hardware logic controller is configured to execute the program, wherein the program is cleared from the hardware logic controller as the program is executed. In the example, as the Output Logic is executed by the hardware logic controller, the Control Logic is configured to clear the Output Logic of the program data, thereby (again) preventing the hardware logic controller from improperly or accidentally activating the Component. The methodology 500 completes at 510.

Figure 6:
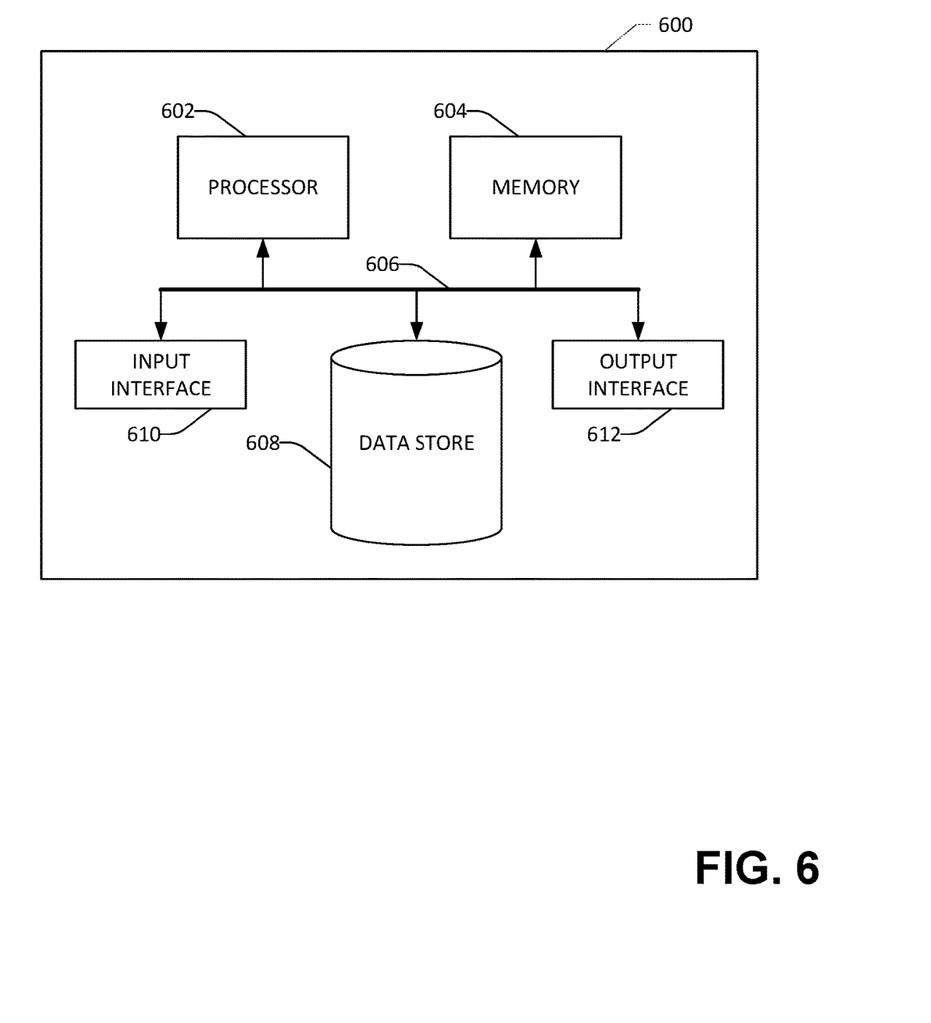
FIG. 6 illustrates an exemplary Command Module (CM).

Referring now to FIG. 6, a high-level illustration of an exemplary computing device 600 that can be used in accordance with the systems and methodology disclosed herein is illustrated. For example, the computing device 600 may be the CM 104 or may be included in the CM 104, and can be utilized to send and receive data to a TIO 108 by way of the Data Bus 106. The computing device 600 includes at least one processor 602 that executes instructions that are stored in a memory 604. The instructions may be, for instance, instructions for implementing functionality described as being carried out by the CM discussed above or instructions for implementing one or more of the methods described above. The processor 602 may access the memory 604 by way of a system bus 606. In addition to storing executable instructions, the memory 604 may also program data, run commands, etc.

The computing device 600 additionally includes a data store 608 that is accessible by the processor 602 by way of the system bus 606. The data store 608 may include executable instructions, program data, run commands, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc., by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A control system comprising:
    a timed input output module (TIO) in communication with a Command Module (CM) and a Component, wherein the CM is configured to send and receive data to and from the TIO by way of a Data Bus, and wherein the TIO is configured to:
        responsive to receiving power and transitioning from a power off state to a power on state, performing one or more operations that prevents the TIO from transmitting control signals to the Component, wherein the one or more operations comprises at least one of:
            forcing outputs of the TIO to zero;
            disabling the run command, wherein the TIO is prevented from executing the program when the run command is disabled; or
            clearing a FIFO buffer of a pattern generator of the TIO;
        subsequent to performing the one or more operations, and responsive to receiving a program that is addressed to the TIO from the CM, store the program in computer-readable storage of the TIO, wherein the program, when executed by the TIO, causes the Component to run a control function; and
        subsequent to storing the program in the computer-readable storage, and responsive to receiving a run command from the CM, execute the program, wherein the TIO is configured to clear the program from the computer-readable storage as the TIO executes the program.

2. The control system of claim 1, wherein the TIO, responsive to performing the one or more operations, is further configured to:
    send status data to the CM, wherein the status data indicates that the one or more operations have been performed;
    enable the run command of the TIO; and
    enable the pattern generator.

3. The control system of claim 1, wherein the TIO comprises a pattern generator that executes the program, and further wherein the TIO stores the program in a FIFO buffer of the pattern generator.

4. The control system of claim 3, wherein the program comprises a plurality of time value pairs, wherein the plurality of time value pairs is stored in the FIFO buffer of the pattern generator within the TIO.

5. The control system of claim 4, wherein the TIO, responsive to the pattern generator executing a time value pair in the plurality of time value pairs, clears the time value pair from the FIFO buffer of the pattern generator.

6. The control system of claim 5, wherein the TIO clears the time value pair from the FIFO of the pattern generator by zeroing out a memory location where the time value pair is stored.

7. The control system of claim 1, wherein the run command comprises an approved validation value, and further wherein the TIO executes the program only after ascertaining that the run command comprises the approved validation value.

8. The control system of claim 1, wherein the TIO is further configured to:
    responsive to receiving a second run command that comprises an unapproved validation value from the CM, remove the program from the computer-readable data storage.

9. The control system of claim 1, wherein the TIO is in communication with a second Component, further wherein the TIO configured to:
    responsive to receiving a second program that is addressed to the TIO from the CM, store the second program, wherein the second program, when executed by the TIO, causes the second Component to transmit a second control function; and
    responsive to receiving the run command from the CM, execute the second program, wherein the second program is cleared from the hardware logic controller as the second program is executed.

10. The control system of claim 1, wherein the TIO comprises at least one of an application specific integrated circuit (ASIC) or a field programmable gate array (FPGA).

11. A control system comprising:
    a timed input output module (TIO) in communication with a command module (CM), wherein the CM is configured to send and receive data from the TIO by way of a Data Bus, further wherein the TIO is coupled to analog circuitry that is in communication with a Component, the TIO comprises a pattern generator that includes a FIFO buffer, and wherein the TIO is configured to:
        responsive to transitioning from being powered off to being powered on, perform one or more operations to prevent the TIO from transmitting a control signal to the Component by way of the analog circuitry;
        subsequent to transitioning from being powered off to being powered on, and responsive to receiving a program that is addressed to the TIO from the CM, store the program in the FIFO buffer, wherein the program, when executed by the TIO, causes the TIO to transmit a signal over the analog circuitry to the Component, wherein the signal, when received by the Component, causes the Component to run a control function; and
        subsequent to storing the program in the processor-readable memory, and responsive to receiving a run command from the CM, execute the program, wherein the program is executed by the pattern generator, and further wherein the TIO clears the program from the FIFO buffer as the pattern generator executes the program.

12. The control system of claim 11, wherein the one or more operations comprises at least one of:
    forcing outputs of the hardware logic controller to zero;

disabling the run command, wherein the pattern generator is prevented from executing the program when the run command is disabled; or disabling the pattern generator of the TIO.

13. The control system of claim 12, wherein the TIO, responsive to performing the one or more operations, is further configured to:

send status data to the CM, wherein the status data indicates that the TIO has performed the one or more operations;

enable the run command of the TIO; and enable the pattern generator.

14. The control system of claim 11, wherein the program comprises a plurality of time value pairs, wherein the plurality of time value pairs is stored in the FIFO buffer of the pattern generator.

15. The control system of claim 14, wherein the TIO, responsive to the pattern generator executing a time value pair in the plurality of time value pairs, clears the time value pair from the FIFO buffer of the pattern generator.

16. The control system of claim 11, wherein the TIO comprises a field programmable gate array (FPGA).

17. The control system of claim 11, wherein the hardware logic controller comprises an application specific integrated circuit (ASIC).

18. A method that is executed by a timed input output module (TIO) that is in communication with a command module (CM) and a Component by way of a Data Bus, the method comprising:

responsive to being powered on, performing at least one operation with respect to logic of the TIO that prevents the TIO from transmitting a control signal to the Component;

subsequent to performing the at least one operation, and responsive to receiving a program that is addressed to the TIO from the CM, storing the program in a FIFO buffer of a pattern generator of the TIO, wherein the program, when executed by the pattern generator, causes the TIO to transmit the control signal to the Component, wherein the Component performs a control function responsive to receiving the control signal; and subsequent to storing the program in the FIFO buffer, and responsive to receiving a run command from the CM, executing the program, wherein the pattern generator executes the program, and further wherein the TIO clears the program from the FIFO buffer as the pattern generator executes the program.

* * * * *